United States Patent [19]

Sokolow

[11] 4,241,009
[45] Dec. 23, 1980

[54] PARISON PICKERS WITH VARIABLE SPACING

[75] Inventor: Nickolas N. Sokolow, Cheshire, Mass.

[73] Assignee: Beloit Corporation, Beloit, Wis.

[21] Appl. No.: 902,899

[22] Filed: May 4, 1978

Related U.S. Application Data

[62] Division of Ser. No. 808,705, Jun. 21, 1977, Pat. No. 4,106,886.

[51] Int. Cl.³ .................. B29C 17/07; B29C 17/12
[52] U.S. Cl. .................. 264/532; 264/535; 264/536; 264/161; 264/297
[58] Field of Search .................. 264/89, 94, 96–99, 264/297, 532, 161, 535–543; 425/534, 526, 528, 397; 198/459

[56] References Cited

U.S. PATENT DOCUMENTS

| | | | |
|---|---|---|---|
| 3,759,686 | 9/1973 | Trahan | 65/241 X |
| 3,805,943 | 4/1974 | Warren | 198/459 X |
| 3,830,360 | 8/1974 | Graff et al. | 198/459 X |
| 3,981,673 | 9/1976 | Sokolow | 425/534 X |
| 4,011,039 | 3/1977 | Oas et al. | 425/534 X |
| 4,140,464 | 2/1979 | Spurr et al. | 425/534 X |

Primary Examiner—Jan H. Silbaugh
Attorney, Agent, or Firm—Hill, Van Santen, Steadman, Chiara & Simpson

[57] ABSTRACT

A blow molding assembly for thermoplastic resins, used, for example, for the manufacture of bottles wherein parisons are heated in an oven and then transported to a mold station where they are biaxially oriented and blown. The invention is particularly concerned with a transport system operating from the oven to the molds, wherein the spacing between the various parisons being transported by means of picker means can be adjusted so that the parisons may be introduced into molds at a spacing different from the spacing of the parisons in their travel through the oven. The transport system includes means for picking off parisons from a conveyor with a predetermined spacing and means for spreading or narrowing the spacing to match the centerline-to-centerline spacing of the molds.

3 Claims, 5 Drawing Figures

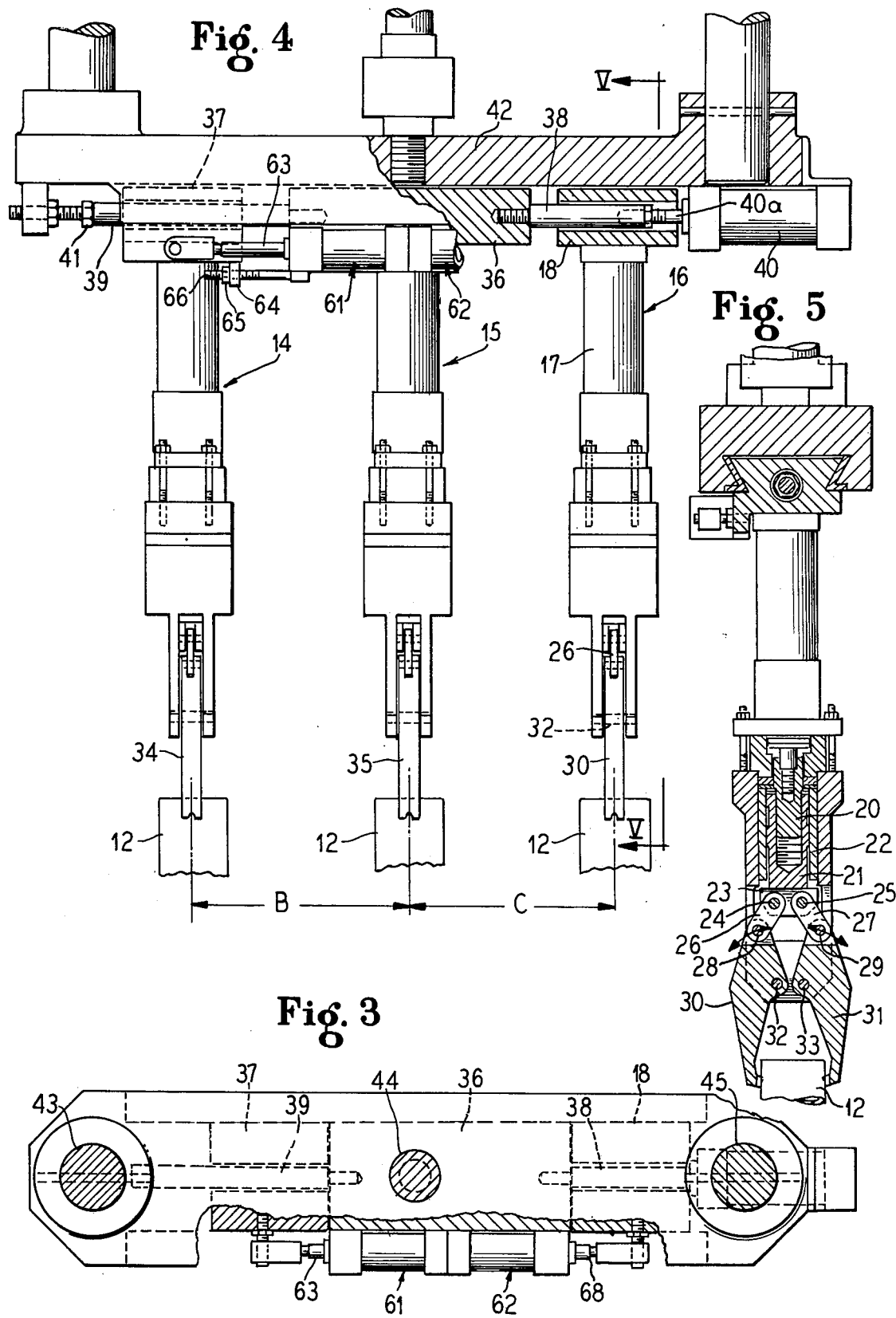

PARISON PICKERS WITH VARIABLE SPACING

This is a division of application Ser. No. 808,705, filed June 21, 1977, now U.S. Pat. No. 4,106,886.

BACKGROUND OF THE INVENTION

1. Field of the Invention

This invention is in the field of transport devices employing picker means which are arranged to pick up a plurality of parisons from an oven in which they are heated to a blow molding temperature and transport them rapidly to molds where the blowing operation takes place. The invention features an automatic system which enables preselection of the spacing between the plurality of parisons to make it possible to vary the spacing between the parisons for various reasons in their transport from the oven to the molds.

2. DESCRIPTION OF THE PRIOR ART

While there are many different types of blow molding processes used, there are three steps which are included in all. First, there is the formation of a hollow tube of molten resin known as a parison. Next, the parison must be positioned between mold halves, and finally, the parison is blown with compressed air so that it takes the shape of the mold.

The temperature of the parison at the time of blow molding is quite critical to achieve the best results. Therefore, there must be provided an efficient and rapid transport system between the oven in which the parisons are being continuously heated, and the mold system in which they are to be blown. Transfer of the parison to the mold system by means of grippers has the advantage of being mechanically simpler than moving the massive molds to and from the ovens. However, this advantage may be offset by the fact that the parisons have increased time to sag and become chilled during transport.

In one commercial system presently being employed, a conveyor consisting of a roller chain is used for transporting parisons through the heating oven. The spacing of the parisons is controlled by the pitch of the chain, since the parison carrier is attached directly to the chain. With a chain pitch, for example, of 1 inch, the picking must occur in multiples of a double pitch, i.e., at 4 inches or 6 inches, or more. Thus, cavity spacing can be as little as 4 inches which in some cases is too small, or 6 inches which may be too wide.

SUMMARY OF THE INVENTION

This invention provides a blow molding assembly including a transport means which picks parisons off the conveyor chain with the spacing necessitated by the pitch of the chain but in the process of transferring the parisons to the mold, the picker means are spread or narrowed to match the centerline-to-centerline distance of the mold cavities. In the case of three cavities, for example, the two end parisons are not necessarily moved by the same amount. For example, the right picker can be positioned at $4\frac{3}{4}$ inches from the central picker and the left picker could be positioned at $5\frac{1}{8}$ inches from the center if this is the distance required by the size of the container to be formed or by the construction of the mold. The adjustability feature of the present invention makes it possible to use odd size molds which are not specifically built to particular chain and picker dimensions.

More specifically, the blow molding assembly of the present invention involves a transport system which operates between the oven in which the parisons are heated and the blow molds in which they are biaxially stretched and blown. The parisons pass through the oven on a conveyor such as a roller chain in which the parisons are necessarily carried in equally spaced relation through the oven. A carriage including a plurality of spaced picker means is arranged to grasp a plurality of such parisons from the oven and deliver them to the molds. The carriage carries a central picker means with first and second adjoining picker means on either side and an adjustable displacement means operating the first and second picker means to position them relative to the central picker means.

The cycle starts when a particular series of parisons reaches a specific point in the travel on the conveyor. Suitable control means cause the gripper jaws then to engage the parisons and at the same time lateral movement of the pickers is commenced so that they are in step with the movement of the conveyor while the parisons are being lifted. Some time later, a slide carrying the central parison of the group of three starts to move, carrying with it the two outer slides and the adjoining parisons. Eventually, the carriage operates a switch which then initiates lateral movement of the entire carriage and also starts a relative lateral movement between the first and second outer grippers with respect to the center gripper. After a suitable time delay to clear the oven, the carriage starts its downward movement while the gripping means are moving relative to the center gripper. Then, the parisons are in their proper relative orientation and are introduced into the mold where they are clamped at the bottom at the time when the carriage is in its lowermost position. After a short time delay, the carriage starts upward to stretch the parisons while they are in the mold. Finally, the gripper means are released, the molds are closed and then air is injected into the stretched parison to cause the plastic material, usually polypropylene, to conform to the walls of the mold.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 3 is a cross-sectional view taken substantially along the line III—III of FIG. 2;

FIG. 4 is a view in elevation, partly broken away, illustrating the picker means after the two outer pickers have been displaced laterally from the central picker; and FIG. 5 is a cross-sectional view taken substantially along the line V—V of FIG. 4.

DESCRIPTION OF THE PREFERRED EMBODIMENTS

Figure 1:
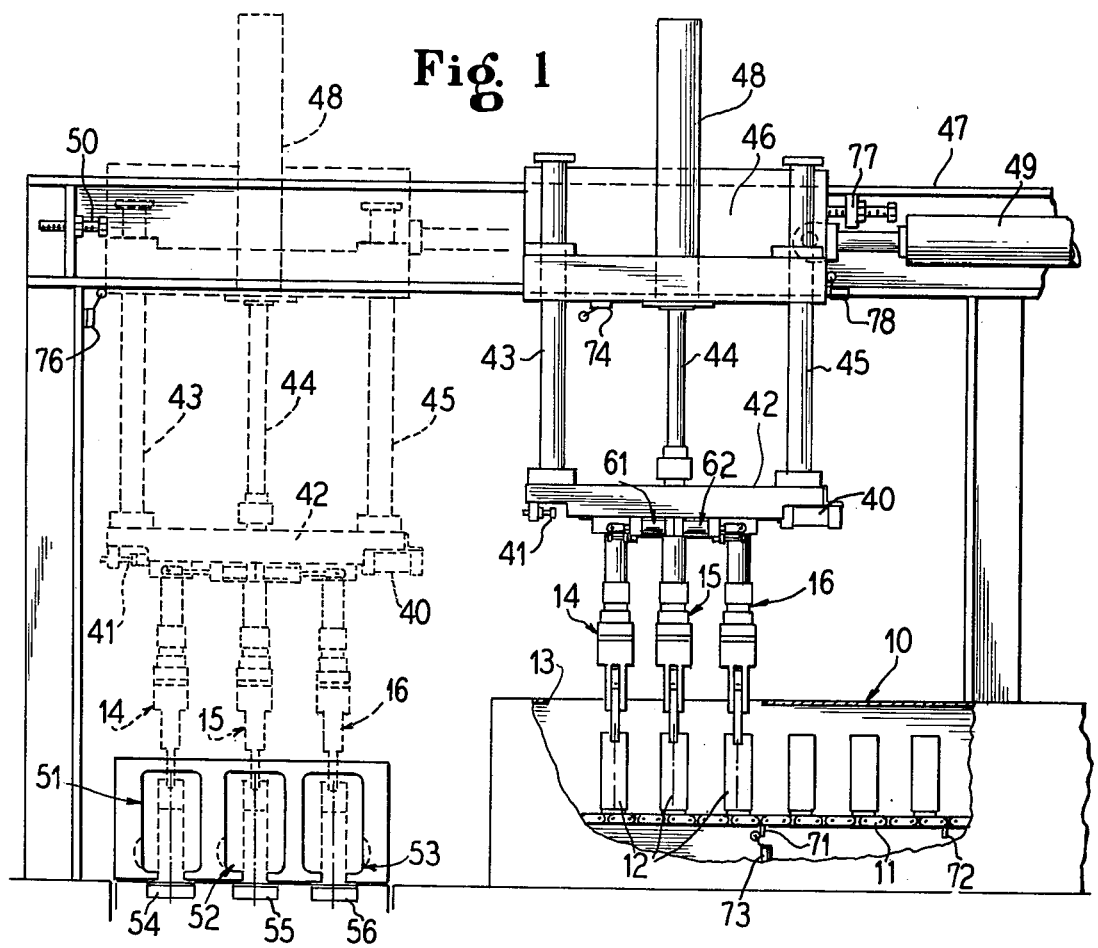
FIG. 1 is a view in elevation, partly broken away, illustrating the position of the picker means initially grasping the parisons in the oven (shown in full lines) and also the position of the picker means and carriage after the parisons have been delivered to the mold and the picker means are about to be released (shown in dashed lines)

Turning to the drawings, reference numeral 10 has been applied generally to a tunnel-type oven in which there is an endless conveyor 11 continuously moving therethrough, the conveyor comprising a roller chain having a set pitch. At spaced intervals along the roller chain, there are carrier pins (not shown) which support parisons 12 composed of polypropylene or other thermoplastic material from which the container is to be blown. In the position of the assembly shown in FIG. 1, the three parisons 12 are ready to be lifted from the oven 10 through an opening 13 provided for that purpose. The parisons 12 are grasped by picker means identified generally as a lefthand picker 14, a central picker 15 and a right-hand picker 16.

The structure of the individual picker is best illustrated in FIG. 5 of the drawings, where one is shown in cross-section. The picker includes a central shaft 17 which is supported from a slide 18 received in a guide 19. The shaft 17 carries a stud 20 which is threaded into an actuator 21 which in turn is slidable relative to a bearing 22. At the bottom of the actuator there is a block 23 containing a pair of pivot pins 24 and 25 about which links 26 and 27 are pivotally mounted. The opposite ends of the links are connected to a pair of opposed pivot pins 28 and 29. A pair of jaws 30 and 31 are mounted by means of pins 32 and 33. When the actuator 21 moves down, the jaws are pivoted through the links 26 and 27 so they engage and tightly hold the parison 12.

The picker means 14 and 15 are essentially the same in operation as the picker means 16 which has just been described. Picker means 14, for example, has jaws 34 and picker means 15 has jaws 35 both of which are arranged to grasp individual parisons 12 jointly with picker means 16. The center picker means 15 is supported from a slide 36 while the left-hand picker means 14 is supported from a slide 37. The two outer slides 18 and 37 are provided with axial bores through which operating rods 38 and 39 extend and are received in threaded engagement in the center slide as best seen in FIGS. 3 and 4.

Figure 2:
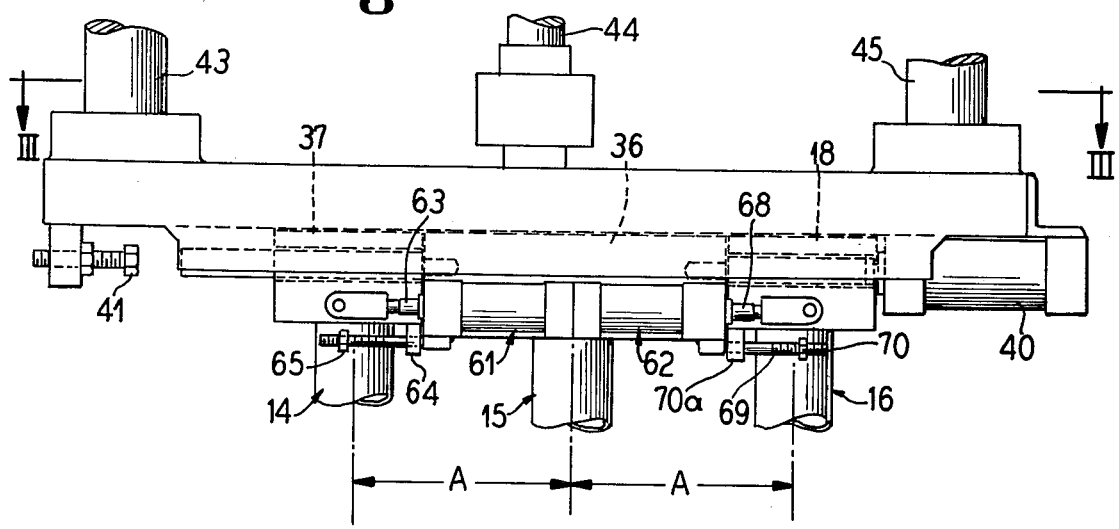
FIG. 2 is a fragmentary view in elevation of the carriage and picker assemblies when the pickers are spaced at the spacing dictated by the spacing of the parisons in the oven.

When the picker means 14 through 16 are in positions such that they directly overlie the parisons 12 on the conveyor chain 11, the slides are in the "collapsed" condition shown in FIG. 2, and the spacing between the jaws of the various pickers 14 through 16 is identified at A in FIG. 2, this being approximately 4 inches for a roller chain having a pitch of 1 inch. In order to synchronize the movement of the three pickers 14 through 16 with the movement of the roller chain while pickers are engaging the parisons and lifting them through the opening 13, there is provided a cylinder 40 through which a piston 40a extends. As fluid pressure is introduced into the cylinder 40, the piston moves all of the pickers 14, 15 and 16 to the left as viewed in FIG. 2, since the slides 18, 36 and 37 are abutting, the limit of such transverse travel being determined by the position of an adjustable stop 41 at the extreme left end of the carriage travel.

The carriage 42 on which the pickers are mounted is arranged for reciprocating vertical movement by means of cylindrical guides 43, 44 and 45 which are received in slidable relation within an upper carriage member 46 which itself is laterally movable on a channel 47. A vertically operating cylinder piston assembly 48 has its piston operatively connected with the guide 44 to accommodate such reciprocatory vertical movement.

Once the pickers 14 through 16 have grasped the parisons 12 and lifted them through the opening 13, a cylinder assembly 49 then begins moving the entire carriage to the left as viewed in FIG. 1. Such movement continues until a stop 50 is reached. During such lateral movement, the carriage 42 is being lowered as well as traveling to the left so that, as the parisons arrive at the mold station, they can be inserted into molds 51, 52 and 53, respectively. Initially, these molds are open instead of being closed as shown in FIG. 1, and the lower end of the parisons 12 are received in clamping means 54, 55 and 56, respectively. The operation of vertically operating cylinder 48 with its associated piston is then reversed to apply tension to the parisons and thereby stretch the parisons axially in one direction. Upon closure of the molds 51 to 53, the parisons are severed leaving scrap pieces held by the pickers 14 to 16, which scrap pieces can be dropped into a suitable receptacle.

During the travel of the parisons from the oven to the molds, the left-hand picker 14 and the right-hand picker 16 may be adjustably positioned with respect to the center picker 15 by the system about to be described. Associated with the central slide 36 are a pair of cylinder and piston assemblies 61 and 62 which determine the displacement between the center picker 15 and the left-hand picker 14, as well as the displacement between the center picker 15 and the right-hand picker 16. When fluid pressure is introduced into the cylinder 61, for example, its piston 63 (FIG. 4) causes the slide 37 to move relative to the center slide 36 until such time as an ear 64 on the picker 14 strikes a nut 65 threaded onto a bolt 66 and having its opposite end secured to the cylinder assembly 61. This spaces the picker 14 from the picker 15 by a distance B which is larger than the original spacing A. Similarly, cylinder 62 is provided with a piston 68 and a threaded bolt 69 having a nut 70 thereon which ultimately engages an ear 70a which acts as a stop for further movement of the piston and spaces the right-hand picker 16 a distance C from the center picker 15, as illustrated in FIG. 4. The distance C may be larger or smaller than the distance B but in the form of the invention illustrated in the drawings, will be larger than the distance A.

A complete operation of one cycle of the machine will now be explained in detail. The roller chain conveyor 11 carries a plurality of actuator tabs 71 and 72 as shown in FIG. 1 spaced sufficiently to accommodate a series of three parisons 12 therebetween. The actuator tab 71 is shown in the process of energizing a switch 73 which operates a solenoid operated valve or the like to cause the gripper jaws on each set of pickers 14 through 16 to grasp an underlying parison 12. At the same time, fluid pressure is introduced into the cylinder and piston assembly 40 to coordinate the movement of the pickers 14 through 16 with the movement of the chain conveyor 11. This lateral movement of the three picker units as a body terminates when stop member 41 is reached. A short time later, in timed sequence, the vertically operating cylinder 48 pulls up on the guide 44 and the entire carriage assembly is lifted so that the parisons 12 are removed through the opening 13. Eventually, a carriage 42 strikes a switch 74 at the completion of its upward vertical stroke. Actuation of the switch 74 brings the cylinder 49 into operation and lateral movement of the entire carriage assembly to the left begins. At the same time, the cylinders 61 and 62 are energized so that the left-hand and right-hand pickers 14 and 16 are moving laterally away from the central picker unit 15 to an amount determined by the positioning of the stop members 65 and 70, respectively.

After a suitable time delay, sufficient for the parisons to clear the oven completely, the vertically operating cylinder 48 causes the carriage to start downwardly while it is still moving laterally so that in effect, the parisons 12 assume a generally arcuate path in moving from the oven 10 to the mold assemblies 51 to 53. At this time, the upper part of the carriage assembly strikes a switch 76 when the parisons 12 are received in the open molds, causing actuation of the clamping means 54 through 56 when the piston of the cylinder assembly 48 is in its lowermost position. After a short builtin time delay, the vertically operating cylinder 48 starts up again, and the grippers release their jaws from the parisons while the cylinder is still moving up. The entire carriage then moves back to the right by actuation of the cylinder assembly 49 until it strikes a right limit assembly 77 and a switch 78 which causes the lower carriage 42 to again be lowered with the pickers 14 through 16 extending into the oven 10. By this time, a new set of parisons has been delivered and a succeeding actuating tab 72 is about to strike the switch 73.

From the foregoing, it will be understood that the system of the present invention provides a mechanism which picks up parisons off a chain conveyor with the spacing dictated by the pitch of the conveyor but in the process of transferring the parisons to the oven, the pickers are spread or narrowed to match the centerline-to-centerline distance of the molding cavities. Consequently, with the system of the present invention, variable picker spacing will permit the use of odd sized molds and does not require especially built chain and picker assemblies.

It should be evident that various modifications can be made to the described embodiments without departing from the scope of the present invention.

I claim as my invention:

1. The method of transporting a plurality of parisons supported on spaced supports while moving through an oven to a plurality of molds whose center-to-center spacing is different from the spacing of said parisons in moving through said oven which comprises:

grasping a group of at least three parisons while said parisons are still moving through said oven, raising said group out of said oven, simultaneously moving said group vertically and laterally toward said plurality of molds, changing the intra-parison spacing between the center parison and its two adjoining neighbors during such vertical and lateral movement toward said molds to achieve a spacing required by said center-to-center mold spacing, clamping said parisons in said molds after said spacing has been changed, and releasing the gripping on said parisons after such clamping.

2. A method according to claim 1 which includes the step of:

tensioning the parisons in said molds to stretch the same axially.

3. A method according to claim 2 which includes the step of:

closing the molds while said parisons are still being tensioned to thereby sever the parisons.

* * * * *